US012577177B2

(12) United States Patent
Liu et al.

(10) Patent No.: US 12,577,177 B2
(45) Date of Patent: Mar. 17, 2026

(54) CERAMIC PLATE HAVING ANTI-COUNTERFEITING VISUAL EFFECT AND PREPARATION METHOD THEREFOR

(71) Applicant: MONALISA GROUP CO., LTD, Foshan City (CN)

(72) Inventors: Yijun Liu, Foshan City (CN); Yang Wu, Foshan City (CN); Qinggang Wang, Foshan City (CN); Lingyan Huang, Foshan City (CN); Pengcheng Chen, Foshan City (CN)

(73) Assignee: MONALISA GROUP CO., LTD, Foshan City (CN)

( * ) Notice: Subject to any disclaimer, the term of this patent is extended or adjusted under 35 U.S.C. 154(b) by 152 days.

(21) Appl. No.: 18/726,771

(22) PCT Filed: Dec. 15, 2022

(86) PCT No.: PCT/CN2022/139206
§ 371 (c)(1),
(2) Date: Jul. 3, 2024

(87) PCT Pub. No.: WO2023/130932
PCT Pub. Date: Jul. 13, 2023

(65) Prior Publication Data
US 2025/0066264 A1    Feb. 27, 2025

(30) Foreign Application Priority Data
Jan. 6, 2022    (CN) .......................... 202210013753.0

(51) Int. Cl.
*C04B 41/50* (2006.01)
*B24B 1/00* (2006.01)
(Continued)

(52) U.S. Cl.
CPC ............ *C04B 41/5022* (2013.01); *B24B 1/00* (2013.01); *C03C 3/087* (2013.01); *C03C 8/04* (2013.01);
(Continued)

(58) Field of Classification Search
CPC ... C04B 41/5022; C04B 41/009; C04B 41/52; C04B 41/89; C03C 3/087; C03C 8/04; C03C 8/08; C03C 8/14; C03C 8/20
See application file for complete search history.

(56) References Cited

U.S. PATENT DOCUMENTS

2020/0140344 A1 * 5/2020 Xiao ....................... C04B 41/52

FOREIGN PATENT DOCUMENTS

CN        102491787 A    6/2012
CN        106830684 A    6/2017
(Continued)

OTHER PUBLICATIONS

CN113563111, machine translation. (Year: 2021).*

*Primary Examiner* — Robert A Vetere
(74) *Attorney, Agent, or Firm* — Alleman Hall LLP

(57) ABSTRACT

A preparation method comprises: preparing a green body using green body powder; applying an overglaze on the surface of the green body; ink-jet printing a pattern on the surface of green body; applying a protective glaze on the surface of the green body; applying an anti-counterfeiting material on the surface of the green body; firing the green body, titanite and high-refractive-index oxide being wetted and wrapped by a molten liquid produced by melting a low-temperature glaze powder in a firing environment, and sunken into the protective glaze without generating opacification; and then polishing to obtain a ceramic plate having an anti-counterfeiting visual effect. The anti-counterfeiting visual effect is a visual effect in which a high-intensity
(Continued)

refraction effect is achieved when the sight line direction is consistent with the path of reflected light, but no refraction effect is achieved when the sight line direction deviates from the path.

6 Claims, 1 Drawing Sheet

(51) Int. Cl.

| | | |
|---|---|---|
| *C03C 3/087* | (2006.01) | |
| *C03C 8/04* | (2006.01) | |
| *C03C 8/20* | (2006.01) | |
| *C04B 41/00* | (2006.01) | |
| *C04B 41/45* | (2006.01) | |
| *C04B 41/52* | (2006.01) | |
| *C04B 41/86* | (2006.01) | |
| *C04B 41/89* | (2006.01) | |

(52) U.S. Cl.
CPC ............ *C03C 8/20* (2013.01); *C04B 41/0072* (2013.01); *C04B 41/009* (2013.01); *C04B 41/4572* (2013.01); *C04B 41/4578* (2013.01); *C04B 41/52* (2013.01); *C04B 41/86* (2013.01); *C04B 41/89* (2013.01); *C03C 2209/00* (2013.01)

(56) References Cited

FOREIGN PATENT DOCUMENTS

| | | | | |
|---|---|---|---|---|
| CN | 111732453 A | | 10/2020 | |
| CN | 111875414 A | | 11/2020 | |
| CN | 113563111 A | * | 10/2021 | ......... G06Q 30/0185 |
| JP | 2008273808 A | | 11/2008 | |

* cited by examiner

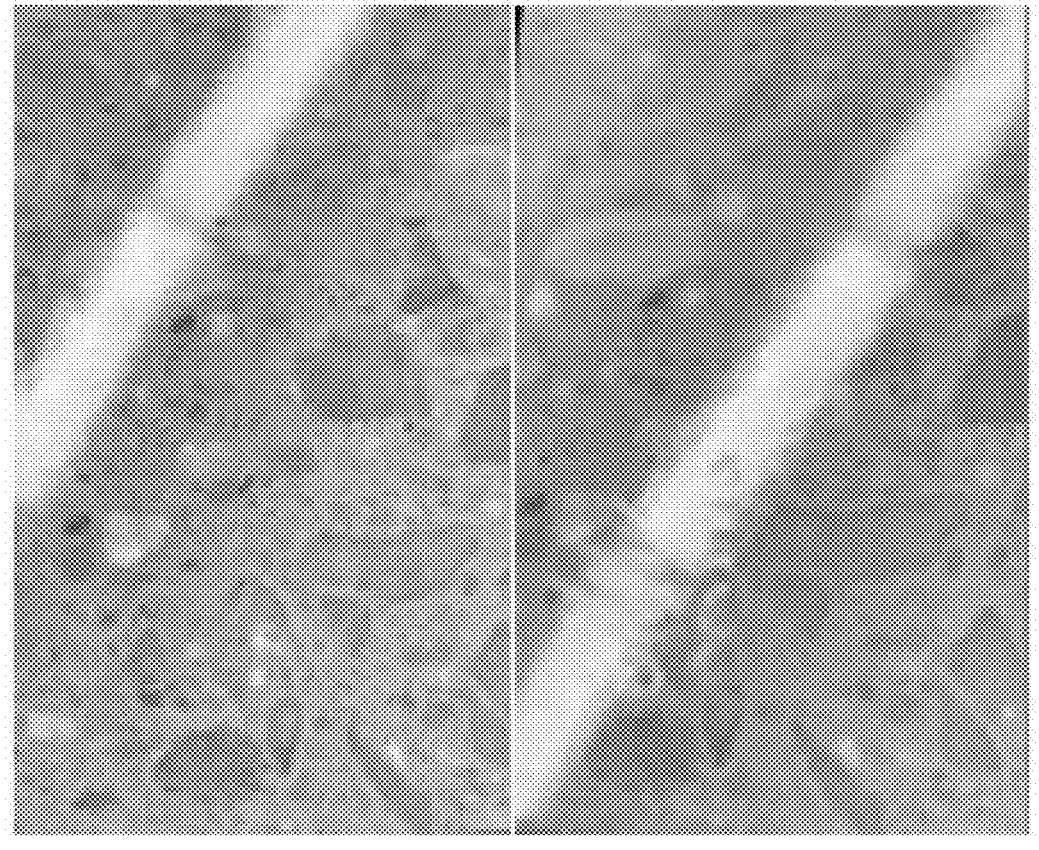

CERAMIC PLATE HAVING ANTI-COUNTERFEITING VISUAL EFFECT AND PREPARATION METHOD THEREFOR

TECHNICAL FIELD

The present invention belongs to the field of architectural ceramics, specifically relates to a ceramic plate having an anti-counterfeiting visual effect and preparation method therefor.

BACKGROUND

The counterfeiting of ceramic products not only undermines the creative enthusiasm of ceramic enterprises, damages the image of innovative ceramic enterprises, and disrupts the normal ceramic market, but may even damage the reputation of famous ceramic enterprises, seriously threatening the sustainable development of the ceramic industry. In view of this, one of the main research directions for ceramic enterprises is to focus on developing ceramic products with anti-counterfeiting functions. Anti-counterfeiting ceramic products can be given a certain identity mark to standardized ceramic products, and with the help of this identity mark, ceramic products can be given flexible identity authorization and protection.

Currently, fluorescent or color changing anti-counterfeiting materials are commonly used on the market for anti-counterfeiting purposes. For example, anti-counterfeiting polymer materials with special structures change color due to the impact from external environmental factors, thus achieving anti-counterfeiting. Alternatively, a temperature sensitive color changing material is colorless at room temperature and exhibits color at a critical temperature. Currently, this type of temperature sensitive color changing material is quite common in daily-use ceramics. Moreover, although inorganic color changing materials such as tungstate series materials, neodymium oxide, etc., can achieve color changing effects, such inorganic color changing materials themselves have colors, which may affect the surface decoration of ceramic products. Bright ink is often used as a decorative color agent on antique tile surfaces, and it shows a significant bright effect on tile surfaces, which does not have an anti-counterfeiting effect.

Chinese patent CN111732453A discloses a ceramic tile with a metallic luster decorative effect and preparation method. The preparation method includes: applying a glaze with a high specific weight and high refractive index on a green body after applying a matte polishing glaze, and then firing to obtain a ceramic tile. The melting temperature and specific weight of the glaze with a high specific weight and high refractive index are higher than those of the matte polishing glaze, so that at least part of the glaze with a high density and high refractive index sinks into the molten liquid phase generated by the matte polishing glaze during the firing process and is completely or partially enveloped by the molten liquid phase. The method uses a high refractive index material(s) and then adopts polishing to obtain a glaze surface with a metallic luster decorative effect. However, the high refractive index material used in this method has a high content and fine particle size, which makes the tile surface prone to opacification and forms white lines on the tile surface. The white lines appear as a metallic luster decoration. However, this method is not suitable for preparing anti-counterfeiting ceramic products.

SUMMARY OF THE INVENTION

In view of the aforementioned problem, the objective of the present invention is to provide a ceramic plate having an anti-counterfeiting visual effect and preparation method therefor. When light shines on the surface of ceramic plate, highly reflected light enters the human eye, giving a brighter visual experience. However, when the line of sight deviates from the path of reflected light, the reflective effect cannot be seen with the naked eye.

In a first aspect, the present invention provides a preparation method for a ceramic plate having an anti-counterfeiting visual effect. The preparation method comprises the following steps:

preparing a green body using green body powder;

applying an overglaze on the green body;

ink-jet printing a pattern on the surface of the green body after applying the overglaze;

applying a protective glaze on the surface of the green body after ink-jet printing the pattern;

applying an anti-counterfeiting material on the surface of the green body after applying the protective glaze; the raw material composition of the anti-counterfeiting material including: in percentage by mass, 20% to 30% of titanite, 3% to 5% of high-refractive-index oxide, and 60% to 80% of a low-temperature glaze powder;

firing the green body after applying the anti-counterfeiting material, the titanite and the high-refractive-index oxide being wetted and wrapped by a molten liquid generated by melting the low-temperature glaze powder in a firing environment, and sunken into the protective glaze without generating opacification; and polishing to obtain the ceramic plate having the anti-counterfeiting visual effect, wherein the anti-counterfeiting visual effect is a visual effect in which a high-intensity refraction effect is achieved when a sight line direction is consistent with a path of reflected light, but no refraction effect is achieved when the sight line direction deviates from the path of reflected light.

Preferably, the initial melting temperature of the low-temperature glaze powder is 1,080° C. to 1,130° C.

Preferably, the chemical composition of low-temperature glaze powder includes: in percentage by mass, 62% to 70% of $SiO_2$, 16% to 18% of $Al_2O_3$, 5.5% to 8.5% of alkaline earth metal oxide, 2.7% to 4.5% of alkali metal oxide, and 1% to 3% of ZnO.

Preferably, the particle sizes of the high-refractive-index oxide and the titanite are independently selected from 1 to 2 μm.

Preferably, the protective glaze is an antique glaze, and the chemical composition of the protective glaze includes: in percentage by mass, 62% to 66% of $SiO_2$, 18% to 20% of $Al_2O_3$, 10% to 14% of alkaline earth metal oxide, 2.7% to 4.5% of alkali metal oxide, and 1% to 3% of ZnO.

Preferably, the protective glaze is a polishing glaze, and the chemical composition of the protective glaze includes: in percentage by mass, 62% to 68% of $SiO_2$, 16% to 19% of $Al_2O_3$, 6% to 11.5% of alkaline earth metal oxide, 3.3% to 5.4% of alkali metal oxide, and 2% to 5% of ZnO.

Preferably, an application method of the protective glaze is spraying glaze, the specific weight of the protective glaze is 1.4 $g/cm^3$ to 1.6 $g/cm^3$, and an application amount is 160 $g/m^2$ to 250 $g/m^2$.

Preferably, a method of applying the anti-counterfeiting material is screen printing the anti-counterfeiting material or spreading frit made of the anti-counterfeiting material.

Preferably, the high refractive index oxide is cerium oxide and/or tin oxide.

In a second aspect, the present invention provides a ceramic plate having an anti-counterfeiting visual effect prepared by any of the aforementioned preparation methods.

BRIEF DESCRIPTION OF DRAWINGS

The FIGURE is a plate surface rendering of a ceramic product in Example 1 of the present invention, the left is a plate surface rendering when a line-of-sight deviates from a path of reflected light, and the right side is a plate surface rendering when the line-of-sight direction is consistent with the path of reflected light.

DETAILED DESCRIPTION OF EMBODIMENTS

The present invention will be further illustrated by the following embodiments below, and it should be understood that the following embodiments are only used to illustrate the present invention rather than to limit it. The following percentages refer to percentages by weight, unless otherwise specified. The following will provide an exemplary explanation of a preparation method for a ceramic plate with an anti-counterfeiting visual effect (anti-counterfeiting ceramic plate) as described in the present invention.

A green body is prepared using green body powder. The chemical composition of the green body powder includes: in percentage by mass, 60% to 67% of $SiO_2$, 20% to 23% of $Al_2O_3$, 0.3% to 0.5% of CaO, 0.4% to 0.6% of MgO, 2.5% to 3.5% of $K_2O$, 2.0% to 2.8% of $Na_2O$, 0.3% to 0.5% of $Fe_2O_3$, and 0.15% to 0.3% of $TiO_2$. The preparation methods of preparing a green body include but are not limited to dry pressing forming.

The green body is dried. The drying temperature is 150° C. to 250° C., and the drying time is 30 min to 40 min. The moisture content of the dried green body is controlled within 0.35 wt % to 0.5 wt %.

An overglaze is applied on the surface of the dried green body. The function of the overglaze is to cover the base color and defects of the green body, and to promote the coloring of subsequent inkjet pattern. The chemical composition of the overglaze includes: in percentage by mass, 60% to 65% of $SiO_2$, 19% to 25% of $Al_2O_3$, 2.2% to 4.0% of alkaline earth metal oxide(s), 5.3% to 7.1% of alkali metal oxide(s), and 3% to 5% of ZnO. As an example, the chemical composition of the overglaze includes: in percentage by mass, 60% to 65% of $SiO_2$, 19% to 25% of $Al_2O_3$, 0.4% to 0.8% of CaO, 0.3% to 0.7% of MgO, 2.8% to 3.6% of $K_2O$, 2.5% to 3.5% of $Na_2O$, 1.5% to 2.5% of BaO, and 3% to 5% of ZnO.

The application method of the overglaze is spraying glaze. The specific weight of the overglaze is 1.45 $g/cm^3$ to 1.55 $g/cm^3$, and the application amount is 200 $g/m^2$ to 230 $g/m^2$.

A pattern is inkjet-printed on the surface of the green body after being applied the overglaze. The texture and color of the pattern can be adaptively varied according to a layout design effect. The pattern can be used as an anti-counterfeiting mark.

A protective glaze is applied on the surface of the green body after being inkjet-printed the pattern. The protective glaze may be a polishing glaze or an antique (archaize) glaze.

The chemical composition of the antique (protective) glaze includes: in percentage by mass, 62% to 66% of $SiO_2$, 18% to 20% of $Al_2O_3$, 10% to 14% of alkaline earth metal oxide(s), 2.7% to 4.5% of alkali metal oxide(s), and 1% to 3% of ZnO. For example, the chemical composition of the antique (protective) glaze includes: in percentage by mass, 62% to 66% of $SiO_2$, 18% to 20% of $Al_2O_3$, 4.5% to 5.5% of CaO, 1.5% to 2.5% of MgO, 2.5% to 3.5% of $K_2O$, 0.2% to 1.0% of $Na_2O$, 3% to 6% of BaO, and 1% to 3% of ZnO.

The chemical composition of the polishing (protective) glaze includes: in percentage by mass, 62% to 68% of $SiO_2$, 16% to 19% of $Al_2O_3$, 6% to 11.5% of alkaline earth metal oxide(s), 3.3% to 5.4% of alkali metal oxide(s), and 2% to 5% of ZnO. For example, the chemical composition of the polishing (protective) glaze includes: in percentage by mass, 62% to 68% of $SiO_2$, 16% to 19% of $Al_2O_3$, 3.5% to 5.5% of CaO, 0.5% to 1% of MgO, 2.8% to 3.9% of $K_2O$, 0.5% to 1.5% of $Na_2O$, 2% to 5% of BaO, and 2% to 5% of ZnO.

The application method of the protective glaze may be spraying glaze. The specific weight of the protective glaze is 1.4 $g/cm^3$ to 1.6 $g/cm^3$, and the application amount is 160 $g/m^2$ to 250 $g/m^2$. The above glaze application process parameters are beneficial for the subsequent use of high-refractive-index oxide(s) and titanite to sink and promote the generation of an anti-counterfeiting effect.

An anti-counterfeiting material is applied on the surface of the green body after applying the protective glaze. The anti-counterfeiting material includes titanite, a high-refractive-index oxide(s) and a low-temperature glaze powder. In some embodiments, the raw material composition of the anti-counterfeiting material includes: in percentage by mass, 20% to 30% of titanite, 3% to 5% of high-refractive-index oxide(s), and 60% to 80% of a low-temperature glaze powder. The refractive index of the high-refractive-index oxide(s) is approximately 2.3 to 2.5. If only the high refractive index oxide(s) are used to form a refractive effect, high refractive index oxide(s) with a high melting point can easily lead to a large number of pores on the glaze surface after being polished. Similarly, if only the titanite is used to form a refractive effect, since the refractive index of titanite is relatively low, although a small amount of titanite can avoid the occurrence of opacities, it can also lead to insignificant refractive effects and thus affecting anti-counterfeiting; meanwhile excessive titanite can easily cause opacification, resulting in no significant difference in refractive effect when the line of sight is consistent with the path of reflected light and deviates from the path of reflected light. After research (of the inventor), the anti-counterfeiting material of the present invention introduces both of the titanite and high-refractive-index oxide(s) and controls the mass ratio of the titanite with relatively low refractive index and high-refractive-index oxide(s) with relatively high refractive index, which can avoid opacification as much as possible and obtain a ceramic product the surface of which has a highly refractive effect in an appropriate line of sight. As an example, the mass ratio of the titanite to high-refractive-index oxide(s) is (5-10):1. Moreover, the melting point of the titanite is relatively low, which can effectively combine with the low-temperature glaze powder, thereby suppressing the generation of bubbles.

The initial melting temperature of the low-temperature glaze powder is 1,080° C. to 1,130° C. The main function of the low-temperature glaze powder is to integrate high-refractive-index oxide(s) with a high melting point into the glaze, and avoid the generation of pores. If the initial melting point of low-temperature glaze powder is too low, the low-temperature glaze powder preferentially melts at a high temperature, which is not conducive to exhaust of gas (generated by the green body). If the initial melting point of low-temperature glaze powder is too high, it cannot achieve a good melting aid effect and is also prone to porosity on the glaze surface.

The chemical composition of the low-temperature glaze powder in Chinese patent CN111732453A includes: in percentage by mass, 0.43% to 0.53% of loss on ignition, 44.67% to 46.52% of $SiO_2$, 8.33% to 9.72% of $Al_2O_3$, 0.18% to 0.23% of $Fe_2O_3$, 0.09% to 0.14% of $TiO_2$, 3.43% to 4.98% of CaO, 0.88% to 1.98% of MgO, 1.74% to 2.57% of $K_2O$, 2.05% to 2.94% of $Na_2O$, 3.89% to 4.98% of $ZrO_2$, 10.02% to 11.70% of ZnO, 5.87% to 6.92% of PbO, 6.51% to 7.03% of $CeO_2$, and 1.98% to 2.50% of BaO. The chemical composition of low-temperature glaze powder of the present invention includes: in percentage by mass, 62% to 70% of $SiO_2$, 16% to 18% of $Al_2O_3$, 5.5% to 8.5% of alkaline earth metal oxide(s), 2.7% to 4.5% of alkali metal oxide(s), and 1% to 3% of ZnO. For example, the chemical composition of low-temperature glaze powder includes: in percentage by mass, 62% to 70% of $SiO_2$, 16% to 18% of $Al_2O_3$, 2.0% to 2.5% of CaO, 0.5% to 1% of MgO, 2.5% to 3.5% of $K_2O$, 0.2% to 1.0% of $Na_2O$, 3% to 5% of BaO, and 1% to 3% of ZnO. It can be seen that the low-temperature glaze powder of the present invention does not contain any opaque components such as zirconia, in order to avoid glaze opacification that cannot be anti-counterfeited. Secondly, the present invention controls the content of silicon oxide, aluminum oxide and flux to ensure that the glaze has an appropriate high-temperature viscosity and a high-temperature fluidity. The technical solution of the aforementioned patent CN111732453A introduces a large amount of zirconia and ceria, both of which have a melting point exceeding 1,800° C., and therefore a large amount of flux needs to be added to reduce the firing temperature.

The low-temperature glaze powder in the present invention has a wide melting temperature range, which is conducive to exhaust of gas and also plays a role in assisting melting. In addition, the molten liquid formed by the low-temperature glaze powder during high-temperature melting has an appropriate viscosity, which can help the titanite and high refractive index oxide(s) sink into the protective glaze during a firing process to prevent them from being removed during polishing. Due to the good fluidity of the low-temperature glaze powder during firing, it can fully wrap the titanite and high refractive index oxide(s) to form a transparent and bright high-refractive-index texture.

In some embodiments, the raw material composition of the anti-counterfeiting material includes: in percentage by mass, 20 to 30 of titanite, 2 to 3 of cerium oxide, 1 to 1.8 of tin oxide, and 60 to 80 of (low-temperature) glaze powder. Titanite, cerium oxide, and tin oxide all have their own color, and when the three are excessive, an undesired color appears on the ceramic surface, thus affecting anti-counterfeiting. For example, excessive content of cerium oxide or titanite can lead to yellowing on the glaze surface, while excessive content of tin oxide can lead to redness on the glaze surface. As mentioned earlier, titanite, cerium oxide, and tin oxide all have a certain refractive index, and when they are not controlled properly, the glaze surface is prone to opacification, and the obtained plate surface has white line(s). Although the white line(s) can present a glistening effect, it cannot achieve anti-counterfeiting. The reason is that compared to ordinary ceramic products, the surface of the anti-counterfeiting ceramic products should only have anti-counterfeiting marks or anti-counterfeiting visual effects under specific circumstances.

The purpose of controlling the weight percentage of low-temperature glaze powder in anti-counterfeiting material at 60 to 80% is to aid melting. If the content of low-temperature glaze powder in anti-counterfeiting material is too low, it is easy to produce pores on the glaze surface. If the content of low-temperature glaze powder in anti-counterfeiting material is too high, the glistening effect of the glaze surface is not obvious, resulting in a low refractive index of the glaze surface and the inability to see a significant bright light effect.

It is worth mentioning that if low-temperature glaze powder is omitted in the anti-counterfeiting material, although the titanite and high refractive index oxide(s) can still sink into the protective glaze, however, due to the lack of low-temperature glaze powder to wrap and wet the titanite and high refractive index oxide(s), it can lead to pinholes on the glaze surface due to poor exhaustion of gas, resulting in uneven glaze surface.

The particle size of ceria, tin oxide, and titanite independently ranges from 1 to 2 μm. If the particle size of ceria, tin oxide, and titanite is too fine, it is easy to cause opacification of glaze surface; and if the particle size of ceria, tin oxide, and titanite is too coarse, it will cause the glaze surface to be at a high temperature, which is not conducive to the discharge of pores.

The method of applying the anti-counterfeiting material is screen printing the anti-counterfeiting material or spreading frits made of the anti-counterfeiting material. In some embodiments, the application amount of the anti-counterfeiting material is 20 g/m² to 30 g/m².

The green body (after being applied the anti-counterfeiting material) is then fired. For example, the green body is fired in a kiln. For example, the highest firing temperature is 1,150° C. to 1,180° C., and the firing time is 55 to 65 min.

The product is (taken out of the kiln and) polished. Polishing with an appropriate grinding blocks combination can make the differentiation of anti-counterfeiting visual effects more significant.

For antique glazed surfaces, grinding blocks used for polishing are: two groups of around 2,000-mesh grinding blocks, and two groups of around 3,000-mesh grinding blocks. Antique glazed surfaces only need to be lightly swept to see obvious differences in glistening.

For polished glazed surfaces, grinding blocks used for polishing are arranged from coarse to fine. The grinding blocks are: two 200-mesh groups of grinding blocks, four groups of 800-mesh grinding blocks, two groups of 1,000-mesh grinding blocks, two groups of 2,000-meshgrinding blocks, and two groups of 3,000-mesh grinding blocks. Excessive polishing depth can easily damage anti-counterfeiting pattern, and insufficient polishing depth cannot achieve an appropriate brightness.

The present invention is based on the principle of light refraction to prepare a ceramic plate with an anti-counterfeiting visual effect. The specifications of the ceramic plate are not limited, and it is also not an improvement point of the present invention. The present invention applies an anti-counterfeiting material containing the titanite, high refractive index oxide(s), and low-temperature glaze powder on the surface of a green body after being applied a protective glaze. During the high temperature of a firing process, the anti-counterfeiting material sink into the protective glaze due to its high specific weight, and after polishing, the glaze surface present a bright light characteristic, which can only be seen in the direction facing the light. That is to say, when the sight line direction deviates from the path of reflected light, there is no significant difference in glossiness on the surface of ceramic products, but when the sight line direction is consistent with the path of reflected light (following the direction of light), a significant difference in glossiness can be observed.

An example will be taken to further illustrate the present invention in detail below. It should also be understood that the following example is only used to further illustrate the present invention rather than to limit the protection scope of the present invention. All non-essential improvements and adjustments which are made by those skilled in the art according to the above contents of the present invention shall fall within the protection scope of the present invention. The specific technological parameters of the following example are merely one example in an appropriate range, that is, those skilled in the art can make choices within the appropriate range through the description herein, but the choices are not limited to the specific values of the following example.

Example 1

The preparation method of an anti-counterfeiting ceramic plate with antique surface comprises the following steps:

Step 1. A green body was prepared using green body powder. And then the green body was dried.

Step 2. An overglaze was applied on the surface of the dried green body. The chemical composition of the overglaze includes: in percentage by mass, 60% of $SiO_2$, 25% of $Al_2O_3$, 0.4% of CaO, 0.6% of MgO, 3.6% of $K_2O$, 3.4% of $Na_2O$, 2.5% of BaO, and 4.5% of ZnO. The application method of the overglaze glaze is spraying glaze. The specific weight of the overglaze was 1.45 $g/cm^3$, and the application amount was 200 $g/m^2$.

Step 3. A pattern was inkjet-printed on the surface of the green body after the overglaze was applied.

Step 4. An antique (protective) glaze was applied on the surface of the green body after the pattern was inkjet-printed. The chemical composition of the protective glaze includes: in percentage by mass, 62 to 66% of $SiO_2$, 18 to 20% of $Al_2O_3$, 4.5 to 5.5% of CaO, 1.5 to 2.5% of MgO, 2.5 to 3.5% of $K_2O$, 0.2 to 1.0% of $Na_2O$, 3 to 6% of BaO, and 1 to 3% of ZnO. The application method of the antique (protective) glaze is spraying glaze. The specific weight of the protective glaze was 1.55 $g/cm^3$, and the application amount was 230 $g/m^2$.

Step 5. An anti-counterfeiting material was screen-printed on the surface of the green body after the antique (protective) glaze was applied. The raw material composition of the anti-counterfeiting material includes: in percentage by mass, 20% of titanite, 2% of cerium oxide, 1% of tin oxide, and 77% of a low-temperature glaze powder. The chemical composition of the low-temperature glaze powder includes: in percentage by mass, 62 to 70% of $SiO_2$, 16 to 18% of $Al_2O_3$, 2.0 to 2.5% of CaO, 0.5 to 1% of MgO, 2.5 to 3.5% of $K_2O$, 0.2 to 1.0% of $Na_2O$, 3 to 5% of BaO, and 1 to 3% of ZnO. The application amount of the anti-counterfeiting material was 20 $g/m^2$.

Step 6. The green body was fired after the anti-counterfeiting material was applied. The highest firing temperature was 1,180° C., and the firing time was 55 min.

Step 7. The green body after being fired was polished. Grinding blocks used for polishing includes: two sets of 2,000-mesh grinding blocks, and two sets of 3,000-mesh grinding blocks.

It can be seen from the FIGURE that when the sight line direction is consistent with the path of reflected light, the surface of the ceramic plate shows a significant difference in glistening, has a high-intensity refractive effect, and an anti-counterfeiting mark can be observed on the plate surface; while when sight line direction deviates from the path of reflected light, there is no refraction effect on the surface of the ceramic plate, and no anti-counterfeiting marks can be observed on the plate surface.

Example 2

The preparation method of an anti-counterfeiting ceramic plate with a polishing glazed surface comprises the following steps:

Step 1. A green body was prepared using green body powder, and then the green body was dried.

Step 2. An overglaze was applied on the surface of the dried green body. The chemical composition of the overglaze includes: in percentage by mass, 65% of $SiO_2$, 23% of $Al_2O_3$, 0.8% of CaO, 0.7% of MgO, 2.8% of $K_2O$, 3.2% of $Na_2O$, 1.5% of BaO, and 3% of ZnO. The application method of the overglaze glaze is spraying glaze. The specific weight of the overglaze was 1.55 $g/cm^3$, and the application amount was 210 $g/m^2$.

Step 3. A pattern was inkjet-printed on the surface of the green body after the overglaze was applied.

Step 4. A polishing (protective) glaze was applied on the surface of the green body after the pattern was inkjet-printed. The chemical composition of the polishing (protective) glaze includes: in percentage by mass, 62 to 68% of $SiO_2$, 16 to 19% of $Al_2O_3$, 3.5 to 5.5% of CaO, 0.5 to 1% of MgO, 2.8 to 3.9% of $K_2O$, 0.5 to 1.5% of $Na_2O$, 2 to 5% of BaO, and 2 to 5% of ZnO. The application method of the protective glaze is spraying glaze. The specific weight of the protective glaze was 1.55 $g/cm^3$, and the application amount was 200 $g/m^2$.

Step 5. An anti-counterfeiting material was screen-printed on the surface of the green body after the polishing (protective) glaze was applied. The raw material composition of the anti-counterfeiting material includes: in percentage by mass, 30% of titanite, 3% of cerium oxide, 1.8% of tin oxide, and 65.2% of a low-temperature glaze powder. The chemical composition of the low-temperature glaze powder includes: in percentage by mass, 62 to 70% of $SiO_2$, 16 to 18% of $Al_2O_3$, 2.0 to 2.5% of CaO, 0.5 to 1% of MgO, 2.5 to 3.5% of $K_2O$, 0.2 to 1.0% of $Na_2O$, 3 to 5% of BaO, and 1 to 3% of ZnO. The application amount of the anti-counterfeiting material was 30 $g/m^2$.

Step 6. The green body was fired after the anti-counterfeiting material was applied. The highest firing temperature was 1,160° C., and the firing time was 60 min.

Step 7. The green body was polished after being fired. Grinding blocks used for polishing includes: two sets of 200-mesh grinding blocks, four sets of 800-mesh grinding blocks, two sets of 1,000-mesh grinding blocks, two sets of 2,000-mesh grinding blocks, and two sets of 3,000-mesh grinding blocks.

Comparison Example 1

A Comparison example 1 is basically the same as Example 1, with the only difference being: the raw material composition of the anti-counterfeiting material includes: in percentage by mass, 3% of cerium oxide, 2% of tin oxide, and 95% of the low-temperature glaze powder.

In Comparison example 1, only high refractive index oxides were used, and the plate surface appears opacification, resulting in white lines on the plate surface without any anti-counterfeiting visual effect.

Comparison Example 2

A Comparison example 2 is basically the same as Example 1, with the only difference being: the raw material composition of the anti-counterfeiting material includes: in percentage by mass, 30% of titanite, and 70% of the low-temperature glaze powder.

In Comparison example 2, merely titanite was used. The high content of titanite easily leads to opacities on the glaze. However, the low content of titanite results in a weak refractive effect on the glaze surface.

Comparison Example 3

A Comparison example 3 is basically the same as Example 1, with the only difference being: the raw material composition of the anti-counterfeiting material includes: in percentage by mass, 40% of titanite, 3% of cerium oxide, 3% of tin oxide, and 54% of the low-temperature glaze powder.

In Comparison example 3, the excessive use of high-refractive-index materials resulted in an opacifying effect on the glaze surface.

What is claimed is:

1. A preparation method for a ceramic plate having an anti-counterfeiting visual effect, comprising the following steps:

preparing a green body using green body powder;

applying an overglaze on the green body;

ink-jet printing a pattern on the surface of the green body after applying the overglaze;

applying a protective glaze on the surface of the green body after ink-jet printing the pattern;

applying an anti-counterfeiting material on the surface of the green body after applying the protective glaze, the raw material composition of the anti-counterfeiting material including: in percentage by mass, 20% to 30% of titanite, 3% to 5% of high-refractive-index oxide, and 60% to 80% of a low-temperature glaze powder; the chemical composition of the low-temperature glaze powder including: in percentage by mass, 62% to 70% of $SiO_2$, 16% to 18% of $Al_2O_3$, 5.5% to 8.5% of alkaline earth metal oxides, 2.7% to 4.5% of alkali metal oxides, and 1% to 3% of ZnO;

the high-refractive-index oxide(s) being cerium oxide and/or tin oxide; and the particle sizes of the high-refractive-index oxide(s) and titanite being independently selected from 1 to 2 µm;

firing the green body after applying the anti-counterfeiting material, the titanite and the high-refractive-index oxide being wetted and wrapped by a molten liquid generated by melting the low-temperature glaze powder in a firing environment, and sunken into the protective glaze without generating opacification; and polishing to obtain the ceramic plate having the anti-counterfeiting visual effect, wherein the anti-counterfeiting visual effect is a visual effect in which a high-intensity refraction effect is achieved when a sight line direction is consistent with a path of reflected light, but no refraction effect is achieved when the sight line direction deviates from the path of reflected light.

2. The preparation method of claim 1, wherein an initial melting temperature of the low-temperature glaze powder is 1,080° C. to 1,130° C.

3. The preparation method of claim 1, wherein the protective glaze is an antique glaze, and the chemical composition of the protective glaze includes: in percentage by mass, 62% to 66% of $SiO_2$, 18% to 20% of $Al_2O_3$, 10% to 14% of alkaline earth metal oxide, 2.7% to 4.5% of alkali metal oxide, and 1% to 3% of ZnO.

4. The preparation method of claim 1, wherein the protective glaze is a polishing glaze, and the chemical composition of the protective glaze includes: in percentage by mass, 62% to 68% of $SiO_2$, 16% to 19% of $Al_2O_3$, 6% to 11.5% of alkaline earth metal oxide, 3.3% to 5.4% of alkali metal oxide, and 2% to 5% of ZnO.

5. The preparation method of claim 1, wherein an application method of applying the protective glaze is spraying glaze, the specific weight of the protective glaze is 1.4 g/cm3 to 1.6 g/cm$^3$, and an application amount is 160 g/m$^2$ to 250 g/m$^2$.

6. The preparation method of claim 1, wherein an application method of applying the anti-counterfeiting material is screen printing the anti-counterfeiting material or spreading frit made of the anti-counterfeiting material.

\* \* \* \* \*